United States Patent
Hotei et al.

(10) Patent No.: US 9,638,320 B2
(45) Date of Patent: May 2, 2017

(54) SHIFT POSITION DETECTING DEVICE

(71) Applicant: HONDA MOTOR CO., LTD., Tokyo (JP)

(72) Inventors: Takashi Hotei, Wako (JP); Takashi Tetsuka, Wako (JP); Dai Arai, Wako (JP); Atsushi Chiba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 265 days.

(21) Appl. No.: 14/314,621

(22) Filed: Jun. 25, 2014

(65) Prior Publication Data
US 2015/0006042 A1    Jan. 1, 2015

(30) Foreign Application Priority Data
Jun. 28, 2013  (JP) .................................. 2013-136929

(51) Int. Cl.
| | | |
|---|---|---|
| *B60W 10/06* | (2006.01) | |
| *B60W 10/11* | (2012.01) | |
| *F16H 63/18* | (2006.01) | |
| *F16H 59/70* | (2006.01) | |

(52) U.S. Cl.
CPC ............. *F16H 63/18* (2013.01); *F16H 59/70* (2013.01)

(58) Field of Classification Search
None
See application file for complete search history.

(56) References Cited

U.S. PATENT DOCUMENTS

| | | | | |
|---|---|---|---|---|
| 6,339,325 | B1* | 1/2002 | Oda ........................ | F16H 59/70 324/207.2 |
| 6,683,263 | B1* | 1/2004 | Scheib ..................... | F16H 59/70 200/61.88 |
| 2006/0160660 | A1* | 7/2006 | Zenno ................... | B60W 10/02 477/114 |
| 2010/0107792 | A1* | 5/2010 | Saitoh ..................... | F16H 63/18 74/337.5 |
| 2010/0107796 | A1* | 5/2010 | Tomoda .................. | F16H 63/18 74/473.1 |

FOREIGN PATENT DOCUMENTS

JP          2011-196517 A      10/2011

* cited by examiner

*Primary Examiner* — Edwin A Young
(74) *Attorney, Agent, or Firm* — Birch, Stewart, Kolasch & Birch, LLP

(57) ABSTRACT

A shift position detecting device where a shift position determining member is provided for determining a shift position based on a combination of switching modes of three switches corresponding to at least one of a plurality of projection rows each having a plurality of projection portions in a one-by-one basis, and "1, 1, 1" indicative of an ON state of each switch is allocated as a detection logic at a neutral position arranged between a first speed position and a second speed position, wherein a change in friction at the time of a shift operational to the neutral position is alleviated thus giving an operational feeling with no discomfort to a rider. Two projection rows that are objects to be detected by two specified switches among the three switches are formed so as to change switching modes of the specified switches from an OFF state to an ON state.

20 Claims, 13 Drawing Sheets

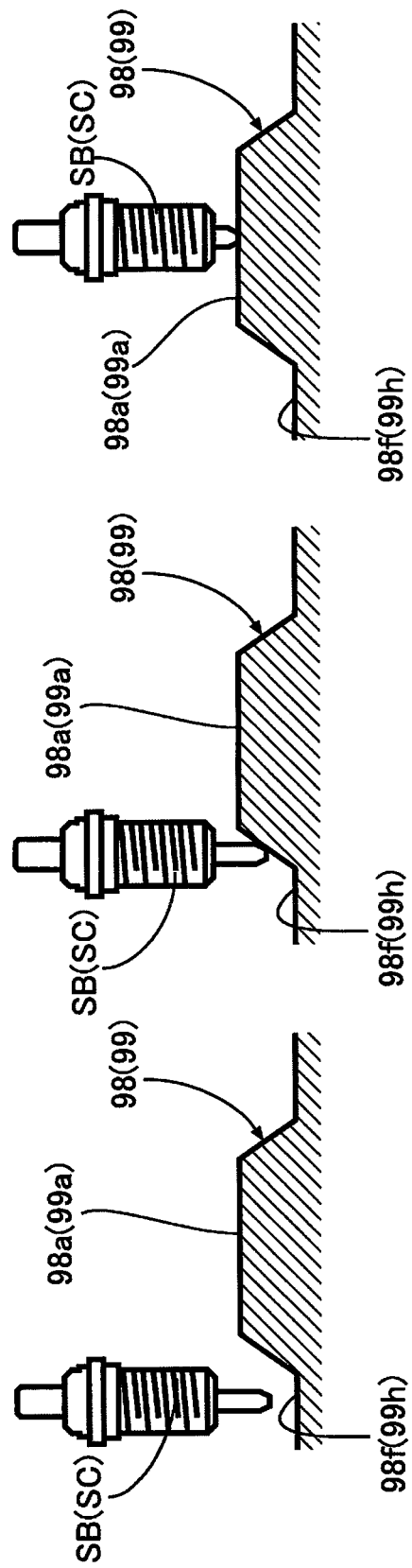

SHIFT POSITION DETECTING DEVICE

CROSS-REFERENCE TO RELATED APPLICATIONS

The present application claims priority under 35 USC 119 to Japanese Patent Application No. 2013-136929 filed Jun. 28, 2013 the entire contents of which are hereby incorporated by reference.

BACKGROUND OF THE INVENTION

1. Field of the Invention

The present invention relates to a shift position detecting device that includes a plurality of projection rows each of which includes projecting portions arranged at a plurality of places in a spaced-apart manner in the circumferential direction of a shift drum constituting a part of a multi-stage transmission having gear trains of a plurality of shift stages that are selectively establishable, and are mounted on the shift drum. Three switches that are fixedly arranged at least one by one corresponding to the plurality of projection rows such that a switching mode is changed from an OFF state to an ON state by being brought into contact with the projecting portions. A shift position determining means that determines a shift position by collating the shift position allocated to the detection logic based on the detection logic that is formed of "1" generated when the switches are in an ON state and "0" generated when the switches are in an OFF state, wherein "1, 1, 1" is allocated as the detection logic at a neutral position arranged between a first speed position and a second speed position.

2. Description of Background Art

JP-A-2011-196517 discloses a shift position detecting device where a plurality of projection rows each of which has projecting portions at a plurality of places in a spaced-apart manner in the circumferential direction of a shift drum are formed on the shift drum. A present shift position is detected by a combination of the turning ON and OFF of three switches where a switching mode is changed from an OFF state to an ON state by being brought into contact with the projecting portions of the projection rows. In this shift position detecting device, a state where all three switches are turned on is allocated to a neutral position.

Friction is increased at a moment when the switch is brought into contact with the projecting portion of the projection row of the shift drum. However, when timings at which the plurality of switches come into contact with the projecting portions are equal, a friction caused by the contact of the switch to the projecting portion occurs simultaneously with respect to the plurality of the switches. Thus, the movement of the shift drum is liable to be obstructed. More particularly, in the shift position detecting device disclosed in the above-mentioned JP-A-2011-196517 where the state in which all three switches are turned on is allocated to a neutral position, when a shift position is changed to the neutral position from the first speed position or the second speed position, there is a high possibility that the plurality of switches are brought into contact with the projecting portions simultaneously whereby a friction is liable to be increased and, at the same time, when the neutral position is arranged between the first speed position and the second speed position, it is often the case that an operator performs a shift operational toward a neutral position side with a force smaller than a force that he uses in a usual operational. Thus, the operator is liable to easily perceive the influence of a friction. In view of the above, there has been a demand for the reduction of a friction at the time of changing a shift position to a neutral position.

SUMMARY AND OBJECTS OF THE INVENTION

The invention has been made in view of such circumstances, and it is an object of an embodiment of the present invention to provide a shift position detecting device that allows a rider to have an operational feeling with no discomfort by alleviating a change in friction at the time of performing a shift operational to a neutral position.

To achieve the above-mentioned object, according to an embodiment of the present invention, there is provided a shift position detecting device that includes a plurality of projection rows each of which includes projecting portions arranged at a plurality of places in a spaced-apart manner in the circumferential direction of a shift drum constituting a part of a multi-stage transmission having gear trains of a plurality of shift stages that are selectively establishable, and are mounted on the shift drum. Three switches that are fixedly arranged at least one by one to correspond to the plurality of projection rows such that a switching mode is changed from an OFF state to an ON state by being brought into contact with the projecting portions. A shift position determining means determines a shift position by collating the shift position allocated to the detection logic based on the detection logic that is formed of a combination of "1" generated when the switches are in an ON state and "0" generated when the switches are in an OFF state, wherein "1, 1, 1" is allocated as the detection logic at a neutral position arranged between a first speed position and a second speed position, wherein the two projection rows that are objects to be detected by the two specified switches among the three switches are formed so as to change switching modes of the specified switches from an OFF state to an ON state and to displace timings at which the specified switches are brought into an ON state from each other when the shift position is changed from at least one of the first speed position and the second speed position to the neutral position.

According to an embodiment of the present invention, the multi-stage transmission is configured such that a shifter is engaged with a gear that constitutes a part of at least one of the first-speed gear train and the second-speed gear train so as to establish at least one of the first-speed gear train and the second-speed gear train, a timing at which a switching mode of one specified switch out of the two specified switches is brought into an ON state from an OFF state is set on a more neutral position side than switching timings of engagement of the shifter with the gear and releasing of the engagement. In addition, a timing at which a switching mode of the other specified switch is brought into an ON state from an OFF state is arranged simultaneously with the switching timing or on a side more away from the neutral position than the switching timing.

According to an embodiment of the present invention, the multi-stage transmission includes a positioning means that positions the shift drum at rotary positions corresponding to respective shift positions, the positioning means includes a stopper plate that is fixed to the shift drum so as to be rotated together with the shift drum and has an outer periphery on which a plurality of positioning recessed portions corresponding to the respective shift positions and a plurality of intermediate projecting portions each of which is arranged between each two positioning recessed portions are formed. A pressing member that is resiliently brought into contact with an outer periphery of the stopper plate, and a timing at which the switching mode of the other specified switch is brought into an ON state from an OFF state is set on a side more away from the neutral position than a timing at which the pressing member is brought into contact with a top point of the intermediate projecting portion corresponding to a position between the first-speed position and the neutral position or a timing at which the pressing member is brought into contact with a top point of the intermediate projecting portion corresponding to a position between the neutral position and the second-speed position.

According to an embodiment of the present invention, the projection row that constitutes an object to be detected by the remaining switch other than the two specified switches is configured to hold a switching mode of the remaining switch in an ON state in at least one of a time during which a shift position is changed to the neutral position from the first-speed position and a time during which the shift position is changed to the neutral position from the second-speed position.

According to an embodiment of the present invention, the projection row that constitutes an object to be detected by the remaining switch is configured to hold a switching mode of the remaining switch in an ON state in the time during which the shift position is changed to the neutral position from the first-speed position and the time during which the shift position is changed to the neutral position from the second-speed position, and one switch out of the two specified switches and the remaining switch are fixedly arranged corresponding to one common projection row while making phases thereof different from each other.

According to an embodiment of the present invention, when the shift position is changed to the neutral position from at least one of the first-speed position and the second-speed position, a switching mode is changed to an ON state from an OFF state while displacing timings at which two specified switches are brought into an ON state from each other. Accordingly, there is no possibility that two specified switches are simultaneously brought into contact with the projecting portions of the projection row that constitute objects to be detected by these two specified switches. Thus, a change in friction when the shift drum is rotated toward a neutral position side can be alleviated whereby it is possible to give a rider an operational feeling with no discomfort.

According to an embodiment of the present invention, one specified switch is brought into an ON state on a more neutral position side than switching timing of engagement of the shifter with the gear and releasing of the engagement at the time of establishing at least one of the first-speed gear train and the second-speed gear train. Accordingly, in a state where the neutral position is detected, the shifter is surely brought into an engagement released state. Thus, by setting a timing at which the other specified switch is brought into an ON state simultaneously with the switching timing or on a side more away from the neutral position than the switching timing, the degree of freedom in setting the timing at which the other specified switch is brought into an ON state is enhanced.

According to an embodiment of the present invention, the multi-stage transmission includes the positioning means that includes the stopper plate that is rotated together with the shift drum in a state where the plurality of positioning recessed portions corresponding to the respective shift positions and the plurality of intermediate projecting portions each of which is arranged between each two positioning recessed portions are formed on the outer periphery of the stopper plate and the pressing member is resiliently brought into contact with an outer periphery of the stopper plate.

While the timing at which the pressing member is brought into contact with the top point of the intermediate projecting portion becomes the timing at which a friction is increased when the shift drum is rotated, a timing at which the other specified switch is brought into an ON state at the neutral position is set on a side more away from the neutral position than a timing at which the pressing member is brought into contact with the top point of the intermediate projecting portion corresponding to a position between the first-speed position and the neutral position or a top point of the intermediate projecting portion corresponding to a position between the second-speed position and the neutral position. Accordingly, at the time that the shift position is changed to the neutral position, the other specified switch is brought into an ON state at the timing displaced from the timing at which the pressing member is brought into contact with the top point of the intermediate projecting portion. Thus, it is possible to prevent a change in friction from being increased whereby it is possible to give a rider an operational feeling with no discomfort.

According to an embodiment of the present invention, among three switches, the remaining switch other than two specified switches is held in an ON state when the shift position is changed to the neutral position from at least one of the first-speed position and the second-speed position. Thus, there is no timing at which a friction is increased. Accordingly, in setting a timing at which two specified switches are brought into an ON state, it is unnecessary to take into account the timing at which the remaining switch is brought into an ON state. Thus, the degree of freedom in setting a timing at which two specified switches are brought into an ON state can be enhanced.

According to an embodiment of the present invention, among three switches, the remaining switch other than two specified switches is held in an ON state when the shift position is changed to the neutral position from both the first-speed position and the second-speed position. Thus, there is no timing at which a friction is increased. Further, one switch out of the two specified switches and the remaining switch correspond to one common projection row while having different phases. Thus, a change in friction at the time of rotating the shift drum can be minimized while suppressing the number of the projection rows to a minimum value of 2.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 13(a), 13(b) and 13(c) are views for explaining a friction generated by a contact between the switch and the projection.

DETAILED DESCRIPTION OF THE PREFERRED EMBODIMENTS

Figure 1:
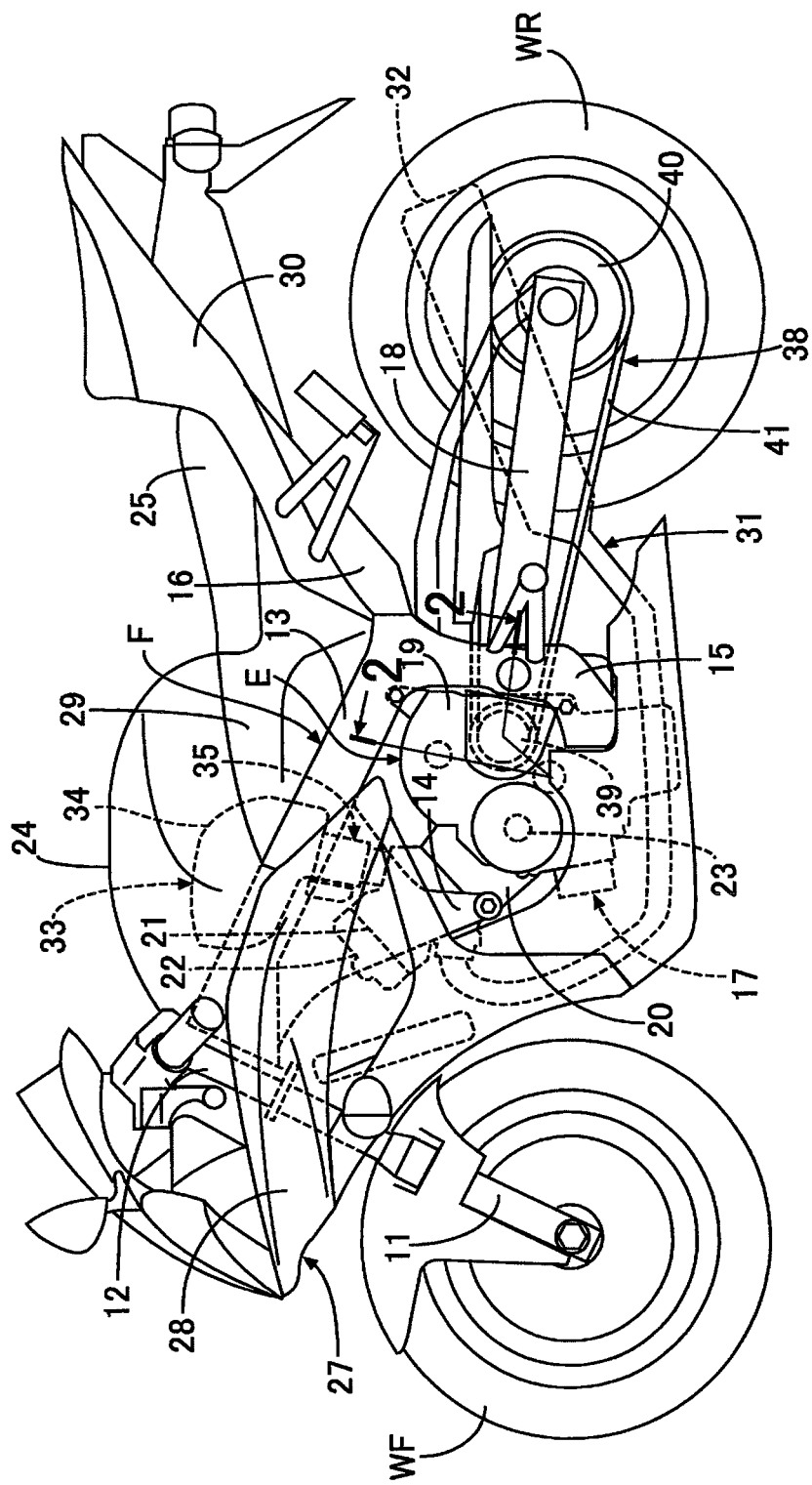
FIG. 1 is a side view of a motorcycle to which the invention is applied.

Hereinafter, an embodiment of the invention is explained by reference to FIG. 1 to FIG. 13. As illustrated in FIG. 1, a vehicle body frame F of a motorcycle includes a head pipe 12 that steerably supports a front fork 11 that pivotally supports a front wheel WF; a main frame 13 that extends rearwardly and downwardly from the head pipe 12; an engine hanger 14 that extends downwardly from a front portion of the main frame 13; a pivot frame 15 that extends downwardly from a rear portion of the main frame 13; and a seat rail 16 that extends rearwardly and upwardly from the rear portion of the main frame 13.

An engine body 17 of an engine E that is arranged below the main frame 13 is supported on the rear portion of the main frame 13, a lower portion of the engine hanger 14 and a lower portion of the pivot frame 15 of the vehicle body frame F. A rear wheel WR driven by power that the engine E generates is pivotally supported on a rear end portion of a swing arm 18. A front end portion of the swig arm 18 is supported on the pivot frame 15 in a vertically swingable manner. A fuel tank 24 is mounted on the main frame 13 above the engine E. A rider's seat 25 arranged behind the fuel tank 24 is supported on the seat rail 16.

A part of the engine E and a part of the vehicle body frame F are covered with a vehicle body cover 27. The vehicle body cover 27 includes a front cowl 28; a pair of left and right side covers 29 that covers a rear lower portion of the fuel tank 24 from both sides and is arranged between the fuel tank 24 and the rider's seat 25 and a rear cowl 30 that is contiguously formed with rear portions of both side covers 29 and extends rearwardly and upwardly.

The engine body 17 of the engine E includes a crankcase 19 that rotatably supports a crankshaft 23 having an axis extending in the width direction of the vehicle body frame F; a cylinder body 20 that is joined to an upper end of a front portion of the crankcase 19 with a cylinder axis thereof inclined frontward; a cylinder head 21 that is joined to an upper end of the cylinder body 20 and a head cover 22 that is joined to an upper end of the cylinder head 21.

An exhaust system 31 that is connected to a side surface of a front portion of the cylinder head 21 includes an exhaust muffler 32 on a rear end thereof, and the exhaust muffler 32 is arranged on a right side of the rear wheel WR. A side surface of a rear portion of the cylinder head 21 faces in the oblique rearward and upward direction. An intake system 33 connected to a side surface of the rear portion of the cylinder head 21 includes an air cleaner 34 that is arranged above the head cover 22 in a state where the air cleaner 34 is covered with the fuel tank 24 and a throttle device 35 that is interposed between the air cleaner 34 and the cylinder head 21.

Figure 2:
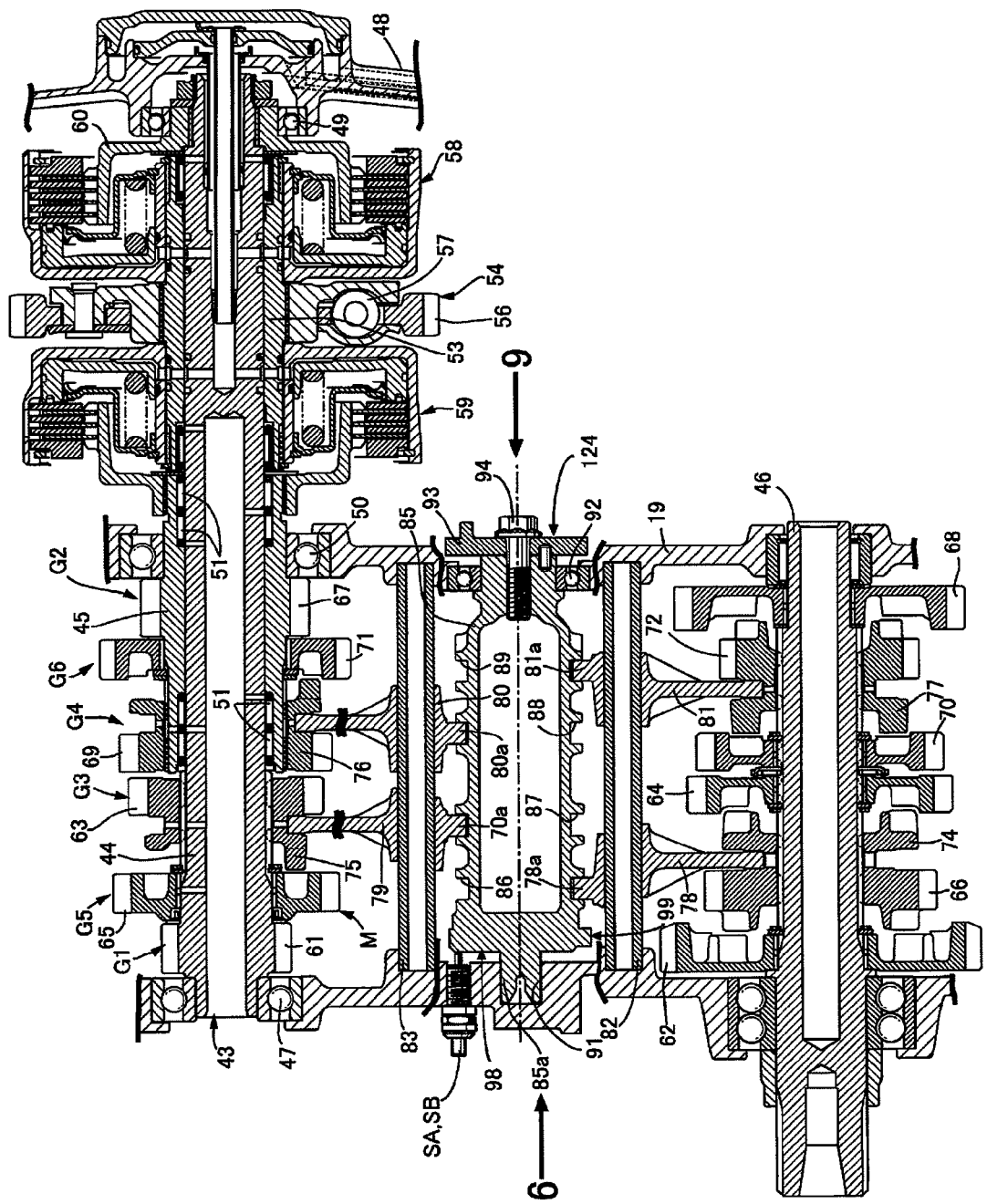
FIG. 2 is a cross-sectional view taken along a line 2-2 in FIG. 1.

In FIG. 2, a sequential-type multistage transmission M is housed in the inside of the crankcase 19. The multistage transmission M is configured such that gear trains of a plurality of shift stages, for example, first-speed to sixth-speed gear trains G1 to G6 that are selectively establishable are arranged between a main shaft 43 and a counter shaft 46. An axis of the main shaft 43 and an axis of the counter shaft 46 are arranged parallel to the crankshaft 30. One end of the counter shaft 46 projects from a side surface of the rear portion of the crankcase 19, and rotational power outputted from the counter shaft 46 is transmitted to the rear wheel WR that constitutes a drive wheel by way of a power transmission means 38 as shown in FIG. 1. The power transmission means 38 is constituted such that an endless drive chain 41 extends between and is wound around a drive sprocket 39 fixed to a shaft end of the counter shaft 46 and a driven sprocket 40 mounted on the rear wheel WR coaxially.

The main shaft 43 includes a first shaft 44 and a second shaft 45 that allows the first shaft 44 to coaxially pass therethrough in a relatively rotatable manner. The first-speed gear train G1, the third-speed gear train G3 and the fifth-speed gear train G5 are arranged between the first shaft 44 and the counter shaft 46, while the second-speed gear train G2, the fourth-speed gear train G4 and the sixth-speed gear train G6 are arranged between the second shaft 45 and the counter shaft 46.

The first shaft 44 has a smaller diameter than the second shaft 45. One end portion of the first shaft 44 is rotatably supported on the crankcase 19 by way of a ball bearing 47. The other end side of the first shaft 44 rotatably penetrates the crankcase 19, and the other end portion of the first shaft 44 is rotatably supported on a crankcase cover 48 that is fastened to the crankcase 19 by way of a clutch inner 60 and a ball bearing 49. The second shaft 45 having a larger diameter than the first shaft 44 is rotatably supported on the crankcase 19 by way of a ball bearing 50. An intermediate portion of the first shaft 44 coaxially passes through the second shaft 45 in a relatively rotatable manner, and a plurality of needle bearings 51 are interposed between the first shaft 44 and the second shaft 45.

A power transmission cylindrical shaft 53 that is arranged adjacent to the second shaft 45 in the axial direction is mounted on the other end side of the first shaft 44 in a relatively rotatable manner, and power transmitted from the crankshaft 30 is transmitted to the power transmission cylindrical shaft 53 by way of a primary speed reduction device 54 and a damper spring 57. The primary speed reduction device 54 is constituted of a drive gear (not shown in the drawing) that is rotated together with the crankshaft 30, and a driven gear 56 that is arranged coaxially with the first and second shafts 44, 45 in a state where the driven gear 56 is meshed with the drive gear. The driven gear 56 is connected to the power transmission cylindrical shaft 53 by way of the damper spring 57.

A first hydraulic clutch 58 is arranged between the power transmission cylindrical shaft 53 and the first shaft 44, the clutch inner 60 that the first hydraulic clutch 58 includes is connected to the other end portion of the first shaft 44 in a relatively non-rotatable manner, and the ball bearing 49 is interposed between the clutch inner 60 and the crankcase cover 48. A second hydraulic clutch 59 that sandwiches the primary speed reduction device 54 between the second hydraulic clutch 59 and the first hydraulic clutch 58 is arranged between the power transmission cylindrical shaft 53 and the second shaft 45.

When the first hydraulic clutch 58 is in a power transmission state so that power is transmitted to the first shaft 44 from the crankshaft 30, power can be transmitted to the counter shaft 46 from the first shaft 44 by way of the gear train selectively established from the first-speed, third-speed and fifth-speed gear trains G1, G3 and G5. When the second hydraulic clutch 59 is in a power transmission state so that power is transmitted to the second shaft 45 from the crankshaft 30, power can be transmitted to the counter shaft 46 from the second shaft 45 by way of the gear train selectively established from the second-speed, fourth-speed and sixth-speed gear trains G2, G4 and G6.

The first-speed, third-speed and fifth-speed gear trains G1, G3 and G5 are arranged between a portion of the first shaft 44 that sandwiches the second shaft 45 with the first and second hydraulic clutches 58, 59. More specifically, the first-speed, third-speed and fifth-speed gear trains G1, G3 and G5 are arranged between the portion of the first shaft 44 on one end side that projects from the second shaft 45 and the counter shaft 46. The first-speed gear train G1 is constituted of a first-speed drive gear 61 that is integrally formed with the first shaft 44, and a first-speed driven gear 62 that is supported on the counter shaft 46 in a relatively non-rotatable manner and is meshed with the first-speed drive gear 61. The third-speed gear train G3 is constituted of a third-speed drive gear 63 that is joined to the first shaft 44 in a relatively non-rotatable manner while being slidable in the axial direction, and a third-speed driven gear 64 that is supported on the counter shaft 46 in a relatively rotatable manner and is meshed with the third-speed drive gear 63. The fifth-speed gear train G5 is constituted of a fifth-speed drive gear 65 that is arranged between the first-speed and third-speed drive gears 61, 63 and is supported on the first shaft 44 in a relatively rotatable manner, and a fifth-speed driven gear 66 that is joined to the counter shaft 46 in a relatively non-rotatable manner while being slidable in the axial direction and is meshed with the fifth-speed drive gear 65.

The second-speed gear train G2 is constituted of a second-speed drive gear 67 that is integrally formed with the second shaft 45, and a second-speed driven gear 68 that is supported on the counter shaft 46 in a relatively rotatable manner and is meshed with the second-speed drive gear 67. The fourth-speed gear train G4 is constituted of a fourth-speed drive gear 69 that is joined to the second shaft 45 in a relatively non-rotatable manner while being slidable in the axial direction, and a fourth-speed driven gear 70 that is supported on the counter shaft 46 in a relatively rotatable manner and is meshed with the fourth-speed drive gear 69. The sixth-speed gear train G6 is constituted of a sixth-speed drive gear 71 that is arranged between the second-speed and fourth-speed drive gears 67, 69 and is supported on the second shaft 45 in a relatively rotatable manner, and a sixth-speed driven gear 72 that is joined to the counter shaft 46 in a relatively non-rotatable manner while being slidable in the axial direction and is meshed with the sixth-speed drive gear 71.

A first shifter 74 is supported on the counter shaft 46 in a relatively non-rotatable manner and in an axially slidable manner between the first-speed driven gear 62 and the third-speed driven gear 64, and the fifth-speed driven gear 66 is integrally formed with the first shifter 74. The first shifter 74 is slidable among a position where the first shifter 74 is engaged with the first-speed driven gear 62, a position where the first shifter 74 is engaged with the third-speed driven gear 64, and a position where the first shifter 74 is engaged with neither the first-speed driven gear 62 nor the third-speed driven gear 64. A second shifter 75 is supported on the first shaft 44 in a relatively non-rotatable manner and in an axially slidable manner in a state where the second shifter 75 sandwiches the fifth-speed drive gear 65 between the second shifter 75 and the first-speed drive gear 61, and the third-speed drive gear 63 is integrally formed with the second shifter 75. The second shifter 75 is slidable between a position where the second shifter 75 is engaged with the fifth-speed drive gear 65 and a position where the engagement between the second shifter 75 and the fifth-speed drive gear 65 is released.

When the first shifter 74 is engaged with the first-speed driven gear 62 in a state where the second shifter 75 is not engaged with the fifth-speed drive gear 65, the first-speed gear train G1 is established. When the first shifter 74 is engaged with the third-speed driven gear 64 in a state where the second shifter 75 is not engaged with the fifth-speed drive gear 65, the third-speed gear train G3 is established. When the second shifter 75 is engaged with the fifth-speed drive gear 65 in a state where the first shifter 74 is engaged with neither the first-speed driven gear 62 nor the third-speed driven gear 64, the fifth-speed gear train G5 is established.

A third shifter 76 is supported on the second shaft 45 in a relatively non-rotatable manner and in an axially slidable manner in a state where the sixth-speed drive gear 71 is sandwiched between the third shifter 76 and the second-speed drive gear 67. The fourth-speed drive gear 69 is integrally formed with the third shifter 76. The third shifter 76 is slidable between a position where the third shifter 76 is engaged with the sixth-speed drive gear 71 and a position where the engagement between the third shifter 76 and the sixth-speed drive gear 71 is released. Further, a fourth shifter 77 is supported on the counter shaft 46 in a relatively non-rotatable manner and in an axially slidable manner between the second-speed driven gear 68 and the fourth-speed driven gear 70. The sixth-speed driven gear 72 is integrally formed with the fourth shifter 77. The fourth shifter 77 is slidable among a position where the fourth shifter 77 is engaged with the second-speed driven gear 68, a position where the fourth shifter 77 is engaged with the fourth-speed driven gear 70, and a position where the fourth shifter 77 is engaged with neither the second-speed driven gear 68 nor the fourth-speed driven gear 70.

When the fourth shifter 77 is engaged with the second-speed driven gear 68 in a state where the third shifter 76 is not engaged with the sixth-speed drive gear 71, the second-speed gear train G2 is established. When the fourth shifter 77 is engaged with the fourth-speed driven gear 70 in a state where the third shifter 76 is not engaged with the sixth-speed drive gear 71, the fourth-speed gear train G4 is established. When the third shifter 75 is engaged with the sixth-speed drive gear 71 in a state where the fourth shifter 77 is engaged with neither the second-speed driven gear 68 nor the fourth-speed driven gear 70, the sixth-speed gear train G6 is established.

The first to fourth shifters 74, 75, 76, 77 are rotatably held by first to fourth shift forks 78, 79, 80, 81 respectively. The first and fourth shift forks 78, 81 are supported on a first shift fork shaft 82 in an axially slidable manner. The second and third shift forks 79, 80 are supported on a second shift fork shaft 83 in an axially slidable manner. The first and second shift fork shafts 82, 83 are supported on the crankcase 19 while having respective axes thereof arranged parallel to the first and second shafts 44, 45 and the counter shaft 46.

A shift drum 85 that has an axis thereof arranged parallel to the first and second shafts 44, 45 and the counter shaft 46 is supported on the crankcase 19 in a rotatable manner about an axis of the crankcase 19. Shift pins 78a, 79a, 80a, 81a that are formed on the first to fourth shift forks 78 to 81 respectively in a projecting manner are slidably engaged with first to fourth lead grooves 86, 87, 88, 89 formed on an outer peripheral surface of the shift drum 85. When the shift drum 85 is rotated, the first to fourth shift forks 78 to 81 slide in the axial direction in accordance with patterns of the first to fourth lead grooves 86 to 89.

A small-diameter shaft portion 85a is coaxially and integrally formed on one end portion of the shift drum 85 in a projecting manner. One end portion of the shift drum 85 is rotatably supported on the crankcase 19 by fitting the small-diameter shaft portion 85a into a bottomed support hole 91 formed in the crankcase 19, while the other end portion of the shift drum 85 is rotatably supported on the crankcase 19 by way of a ball bearing 92.

A stopper plate 93 that is rotated together with the shift drum 85 is fixed to the other end portion of the shift drum 85 by a coaxial bolt 94. The stopper plate 93 is rotatably driven intermittently in response to a shift operational by a rider. When the shift drum 85 is rotatably driven together with the stopper plate 93, the shift drum 85 is rotated so as to sequentially pass a neutral position where none of the first to sixth gear trains G1 to G6 is established and the first-speed position to the sixth-speed position where one of the first to sixth gear trains G1 to G6 is selectively established.

Figure 3:
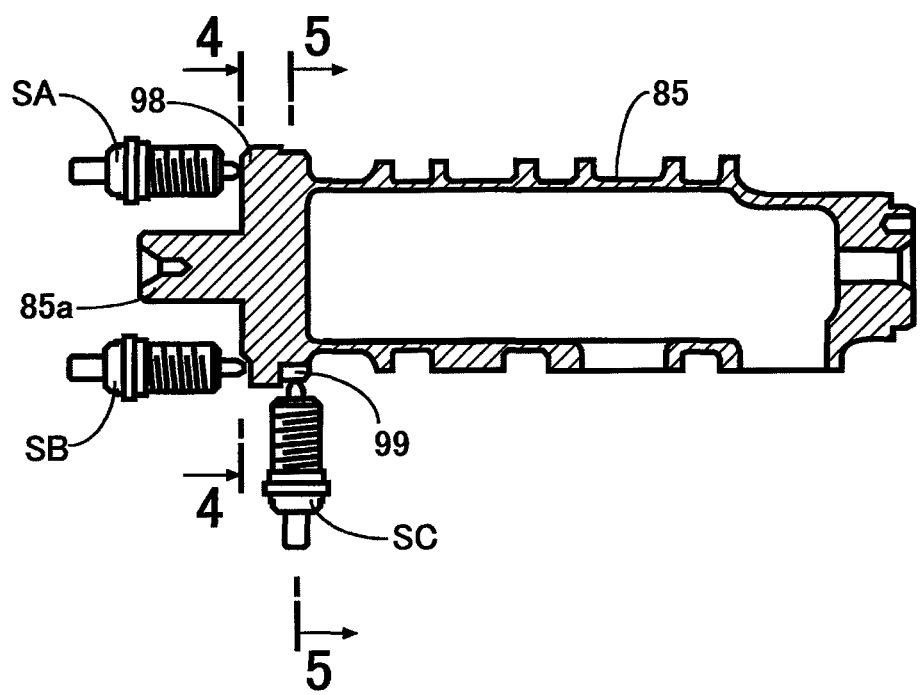
FIG. 3 is a vertical cross-sectional side view showing the arrangement of three switches and a shift drum in a simplified manner.
Figure 4:
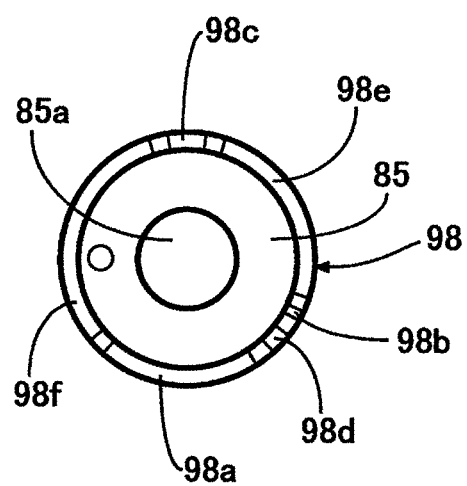
FIG. 4 is a view taken as viewed in an arrow direction from a line 4-4 in FIG. 3.

In FIG. 3 and FIG. 4, a plurality of projection rows (the first and second projection rows 98, 99 in this embodiment) are formed on the other end portion of the shift drum 85. The first projection row 98 includes first to third projecting portions 98a, 98b, 98c that are arranged at three portions of the shift drum 85 in a spaced-apart manner in the circumferential direction of the shift drum 85, and three valley portions 98d, 98e, 98f each of which is arranged between each two projecting portions out of the projecting portions 98a, 98b, 98c. The first to third projecting portions 98a to 98c are formed on the other end surface of the shift drum 85 in a state where the first to third projecting portions 98a to 98c project in the axial direction from the other end surface of the shift drum 85.

Figure 5:
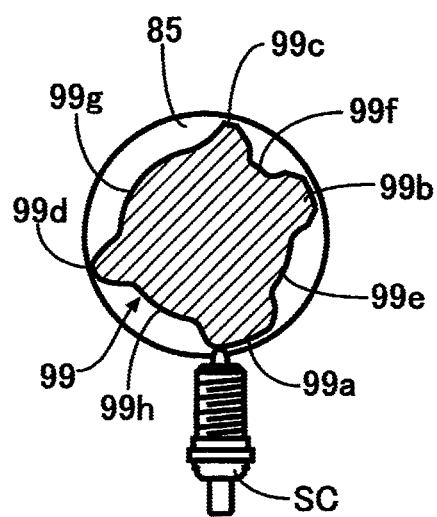
FIG. 5 is a cross-sectional view taken along a line 5-5 in FIG. 3.

To explain this embodiment also by reference to FIG. 5, the second projection row 99 includes fourth to seventh projecting portions 99a, 99b, 99c, 99d that are arranged at a plurality of portions of the shift drum 85 in a spaced-apart manner in the circumferential direction of the shift drum 85, and four valley portions 99e, 99f, 99g, 99h each of which is arranged between each two projecting portions out of the projecting portions 99a to 99d. The fourth to seventh projecting portions 99a to 99d are formed on an outer periphery of the other end portion of the shift drum 85 in a state where the fourth to seventh projecting portions 99a to 99d project in the radial direction from the other end portion of the shift drum 85.

Figure 6:
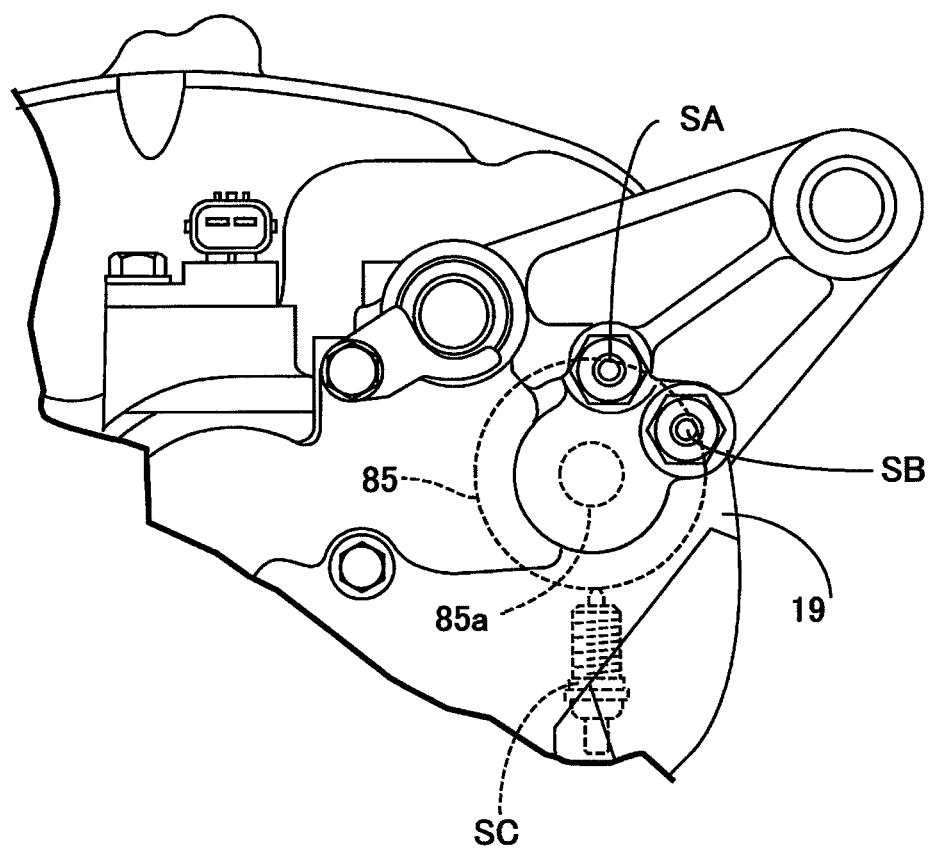
FIG. 6 is a view as viewed in the direction indicated by an arrow 6 in FIG. 2.

To explain this embodiment also by reference to FIG. 6, switches are fixedly arranged at positions corresponding to the first and second projection rows 98, 99 on a one by one basis such that a switching mode is changed from an OFF state to an ON state when the switches are brought into contact with the projecting portions 98a to 98c, 99a to 99d of the first and second projection rows 98, 99. In this embodiment, first and second switches SA, SB are fixedly arranged corresponding to the first projection row 98 used in common by the switches SA, SB. The first and second switches SA, SB are fixed to the crankcase 19 while having respective center axes thereof arranged parallel to the axis of the shift drum 85. A third switch SC corresponding to the second projection row 99 is fixed to the crankcase 19 while having a center axis thereof arranged orthogonal to the axis of the shift drum 85. Further, the first and the second switches SA, SB are fixedly arranged corresponding to the common first projection row 98 while making phases thereof different from each other. In this embodiment, the second switch SB is arranged at the shift position higher than the shift position of the first switch SA by one speed.

Figure 7:
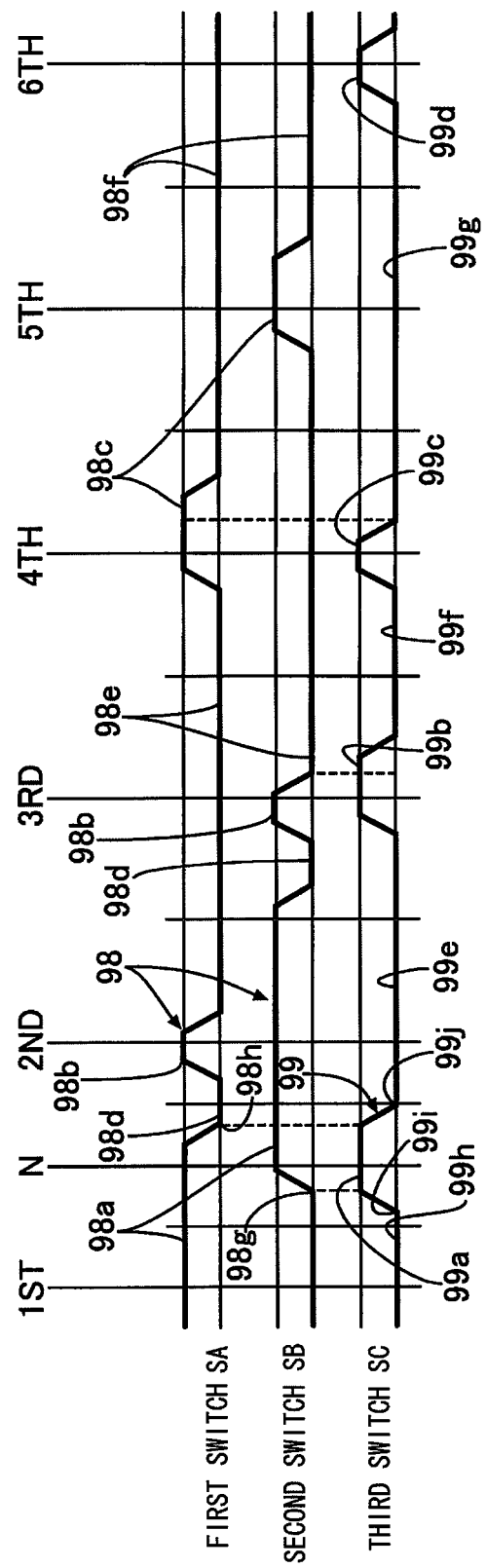
FIG. 7 is a view showing the relationship between first and second projection rows and first to third switches developed in the circumferential direction of a shift drum.

To explain this embodiment also by reference to FIG. 7, on the shift drum 85, the first-speed position to the sixth-speed position are arranged in a spaced-apart manner in the circumferential direction while arranging the neutral position between the first-speed position and the second-speed position. The first projection row 98 is formed to have the first projecting portion 98a that is detected by the first switch SA at the first-speed position (1ST) and the neutral position (N), the second projecting portion 98b that is detected by the first switch SA at the second-speed position (2ND), and the third projecting portion 98c that is detected by the first switch SA at the fourth-speed position (4TH). On the other hand, the second switch SB detects the first projecting portion 98a at the neutral position and the second-speed position, detects the second projecting portion 98b at the third-speed position (3RD), and detects the third projecting portion 98c at the fifth-speed position (5TH). The third projection row 99 is formed to have the fourth projecting portion 99a that is detected by the third switch SC at the neutral position, the fifth projecting portion 99b that is detected by the third switch SC at the third-speed position, the sixth projecting portion 99c that is detected by the third switch SC at the fourth-speed position, and the seventh projecting portion 99d that is detected by the third switch SC at the sixth-speed position (6TH).

Figure 8:
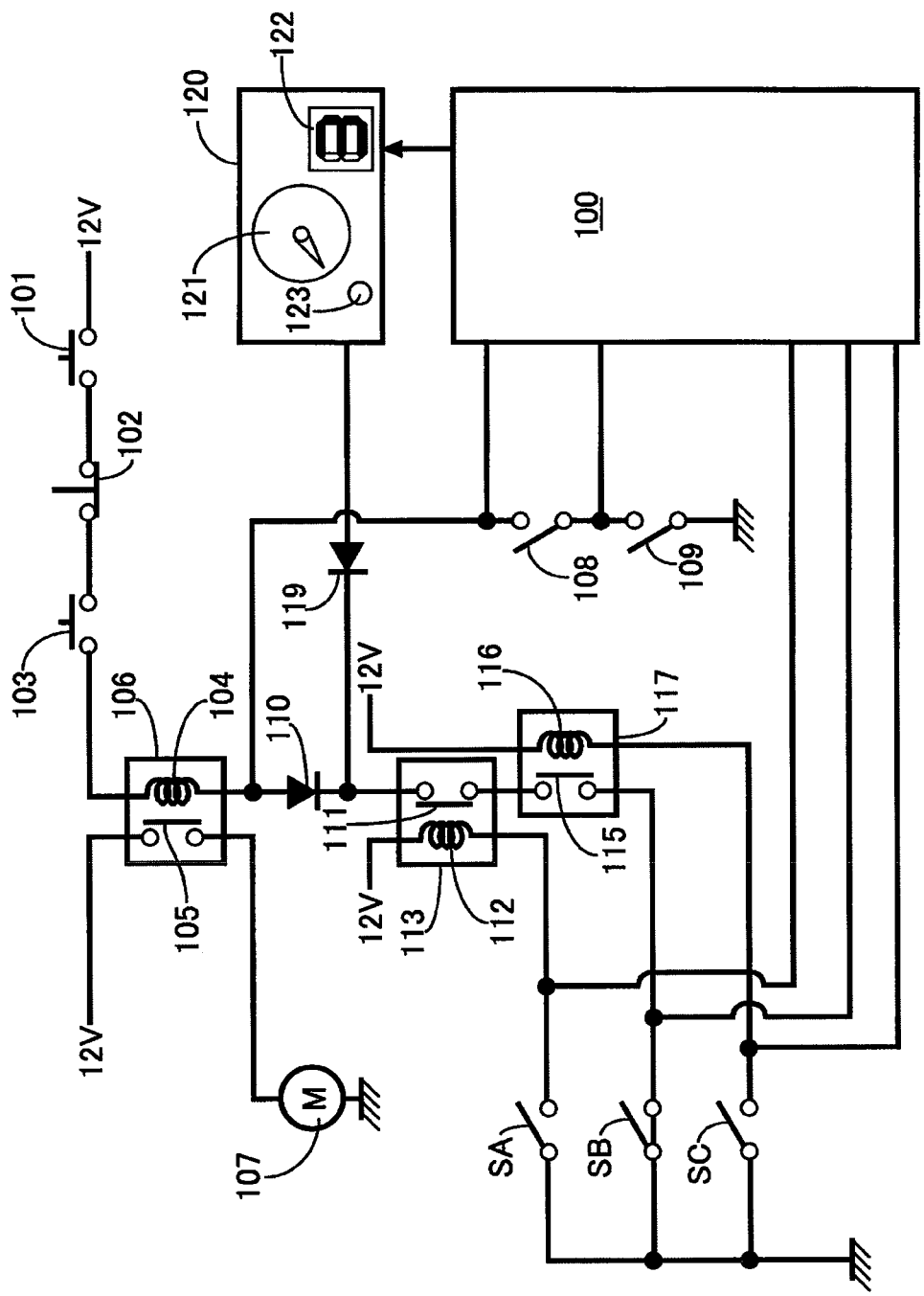
FIG. 8 is a view showing the constitution of an electronic circuit for determining a shift position.

In FIG. 8, the turning on and off of the first to third switches SA, SB, SC are inputted to an electronic control unit 100 that constitutes a shift position determining means. Based on a detection logic that is a combination of "1" generated when the first, second and third switches SA, SB, SC detect the projecting portions 98a to 98c, 99a to 99d and are brought into an ON state and "0" generated when the first, second and third switches SA, SB, SC are in an OFF state, the electronic control unit 100 determines a shift position by collating the shift position allocated to the detection logic.

A vehicle-mounted battery is connected to the electronic control unit 100 through a series circuit that is constituted of a main switch 101 for starting the engine E, an engine stop switch 102, a start switch 103 and a first relay coil 104. The engine stop switch 102 is a normally-closed switch. The first relay coil 104 constitutes a first relay 106 together with a first relay switch 105 arranged between the battery and a starter motor 107.

A connection point between the first relay coil 104 and the electronic control unit 100 is connected to the ground through a series circuit constituted of a clutch lever switch 108 and a side stand switch 109. A connection point between the clutch lever switch 108 and the side stand switch 109 is also connected to the electronic control unit 100 for inputting the turning on and off of the switches 108, 109 to the electronic control unit 100.

A connection point between the first relay coil 104 and the electronic control unit 100 is connected to the ground through a series circuit that is constituted of a first diode 110, a second relay switch 111, a third relay switch 115 and the second switch SB. A series circuit that is constituted of a second relay coil 112 forming a second relay 113 together with the second relay switch 111 and the first switch SA is connected between the battery and the ground. A series circuit that is constituted of a third relay coil 116 forming a third relay 117 together with the third relay switch 115 and the third switch SC is arranged between the battery and the ground.

A connection point between the second relay coil 112 and the first switch SA, a connection point between the third relay switch 115 and the second switch SB, and a connection point between the third relay coil 116 and the third switch SC are connected to the electronic control unit 100 in parallel for inputting the turning on and off of the first, second and third switches SA, SB and SC to the electronic control unit 100.

A meter unit 120 provided to the motorcycle includes a vehicle speed meter 121 indicating a vehicle speed; a shift indicator 122 that indicates a shift position based on information from the electronic control unit 100 and a neutral indicator 123 that is turned on when the multi stage transmission M is in a neutral state. The neutral indicator 123 is connected to the connection point between the first diode 110 and the second relay switch 111 through a second diode 119. More specifically, the neutral indicator 123 is turned on when the first switch SA is turned on so that the second relay coil 112 is excited whereby the second relay switch 111 is turned on, the third switch SA is turned on so that the third relay switch 115 is excited whereby the third relay switch SC is turned on, and the neutral indicator 123 is turned on when the second switch SB is turned on.

Due to the relative arrangement between the first to third switches SA, SB, SC and the first and second projection rows 98, 99 shown in FIG. 7, detection logics described in the following Table are allocated to the respective shift positions of the multi-stage transmission M.

TABLE 1

|  | first switch | second switch | third switch |
| --- | --- | --- | --- |
| first speed | 1 | 0 | 0 |
| Neutral | 1 | 1 | 1 |
| second speed | 1 | 1 | 0 |
| third speed | 0 | 1 | 1 |
| fourth speed | 1 | 0 | 1 |
| fifth speed | 0 | 1 | 0 |
| sixth speed | 0 | 0 | 1 |

According to such allocation of the detection logics, "1,1,1" is allocated as the detection logic at the neutral position. When the shift position is changed to the neutral position from at least one of the first-speed position and the second-speed position, two projection rows 98, 99 that are objects to be detected by two specified switches among the first to third switches SA to SC are formed so as to change switching modes of the specified switches from an OFF state to an ON state and to displace timings at which the specified switches are brought into an ON state from each other.

That is, in this embodiment, when the shift position is changed from the first-speed position where the detection logic is "1, 0, 1" to the neutral position, the second and third switches SB, SC that constitute two specified switches change switching modes thereof into an ON state from an OFF state. To displace timings at which the second and third switches SB, SC are brought into an ON state from each other, as clearly shown in FIG. 7, the first and second projection rows 98, 99 are formed such that, a rising timing 99i of the fourth projecting portion 99a detected by the third switch SC is set earlier than a rising timing 98g of the first projecting portion 98a detected by the second switch SB. Further, when the shift position is changed from the second-speed position where the detection logic is "1, 1, 0" to the neutral position, the first and third switches SA, SC that constitute two specified switches change switching modes thereof into an ON state from an OFF state. To displace timings at which the first and third switches SA, SC are brought into an ON state from each other, as clearly shown in FIG. 7, the first and second projection rows 98, 99 are formed such that, a rising timing 99j of the fourth projecting portion 99a detected by the third switch SC is set earlier than a rising timing 98h of the first projecting portion 98a detected by the first switch SA.

Further, the projection row that constitutes an object to be detected by the remaining switch other than the two specified switches is configured to hold a switching mode of the remaining switch in an ON state in at least one of a time during which the shift position is changed to the neutral position from the first speed position and a time during which the shift position is changed to the neutral position from the second speed position. In this embodiment, when the shift position is changed to the neutral position from the first-speed position, the first switch SA that constitutes the remaining switch is fixedly arranged corresponding to the common first projection row 98 while making a phase thereof different from a phase of the second switch SB that constitutes one switch out of the second and third switches SB, SC that are the two specified switches. When the shift position is changed to the neutral position from the first speed position, as shown in FIG. 7, the first projection row 98 that is an object to be detected by the first switch SA is configured to hold the first switch SA in an ON state by bringing the first switch SA into contact with the first projecting portion 98a. When the shift position is changed to the neutral position from the second speed position, the second switch SB that constitutes the remaining switch is fixedly arranged corresponding to the common first projection row 98 while making a phase thereof different from a phase of the first switch SA that constitutes one switch out of the first and third switches SA, SC that are two specified switches. When the shift position is changed to the neutral position from the second position, the first projection row 98 that is an object to be detected by the second switch SB is configured to hold the second switch SB in an ON state by bringing the second switch SB into contact with the first projecting portion 98a as shown in FIG. 7.

Figure 9:
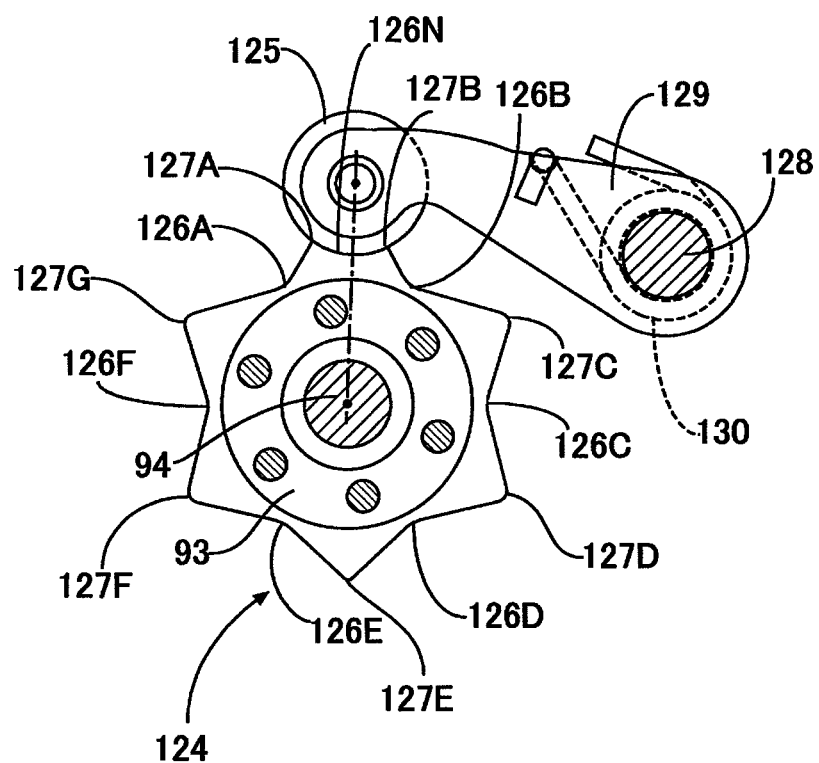
FIG. 9 is a view as viewed in the direction indicated by an arrow 9 in FIG. 2.

To explain this embodiment also by reference to FIG. 9, the multi-stage transmission M includes a positioning means 124 that positions the shift drum 85 at rotary positions corresponding to the respective shift positions. The positioning means 124 is constituted of the stopper plate 93 that is fixed to the shift drum 85 so as to be rotated together with the shift drum 85, and a roller 125 that constitutes a pressing member resiliently brought into contact with an outer periphery of the stopper plate 93.

On an outer periphery of the stopper plate 93, a plurality of positioning recessed portions 126A, 126B, 126C, 126D, 126E, 126F, 126N corresponding to the respective shift positions, and a plurality of intermediate projecting portions 127A, 127B, 127C, 127D, 127E, 127F, 127G each of which is arranged between each two positioning recessed portions 126A to 126F, 126N are formed. The positioning recessed portions 126A to 126F are arranged equidistantly in the circumferential direction of the stopper plate 93 while individually corresponding to the first-speed position to the sixth-speed position, and the positioning recessed portion 126N is arranged at a center portion between the positioning recessed portions 126A, 126B corresponding to the neutral position between the first speed position and the second speed position. The intermediate projecting portion 127A is arranged between the positioning recessed portions 126A, 126N corresponding to the first-speed position and the neutral position. The intermediate projecting portion 127B is arranged between the positioning recessed portions 126N, 126B corresponding to the neutral position and the second speed position. The intermediate projecting portion 127C is arranged between the positioning recessed portions 126B, 126C corresponding to the second-speed position and the third-speed position. The intermediate projecting portion 127D is arranged between the positioning recessed portions 126C, 126D corresponding to the third-speed position and the fourth-speed position. The intermediate projecting portion 127E is arranged between the positioning recessed portions 126D, 126E corresponding to the fourth-speed position and the fifth-speed position. The intermediate projecting portion 127F is arranged between the positioning recessed portions 126E, 126F corresponding to the fifth-speed position and the sixth-speed position. The intermediate projecting portion 127G is arranged between the positioning recessed portions 126F, 126A corresponding to the sixth-speed position and the first-speed position.

The roller 125 is rotatably supported on the other end portion of a stopper arm 129 that has one end portion thereof rotatably supported on the crank case 19 by way of a support shaft 128. Between the stopper arm 129 and the crankcase 19, a torsional spring 130 that rotatably biases the stopper arm 129 is arranged on a side where the roller 125 is pressed to an outer periphery of the stopper arm 93.

The multi-stage transmission M is configured to establish the first-speed gear train G1 and the second-speed gear train G2 by making the first and fourth shifters 72, 77 engage with the first-speed drive gear 62 and the second-speed driven gear 68 that respectively constitute portions of at least one of the first-speed gear train G1 and the second-speed gear train G2, in this embodiment, both of the first-speed gear train G1 and the second-speed gear train G2. A switching timing of the engagement of the first and fourth shifters 72, 77 with the first-speed drive gear 62 and the second-speed driven gear 68 and releasing of the engagement is set as follows.

Figure 10:
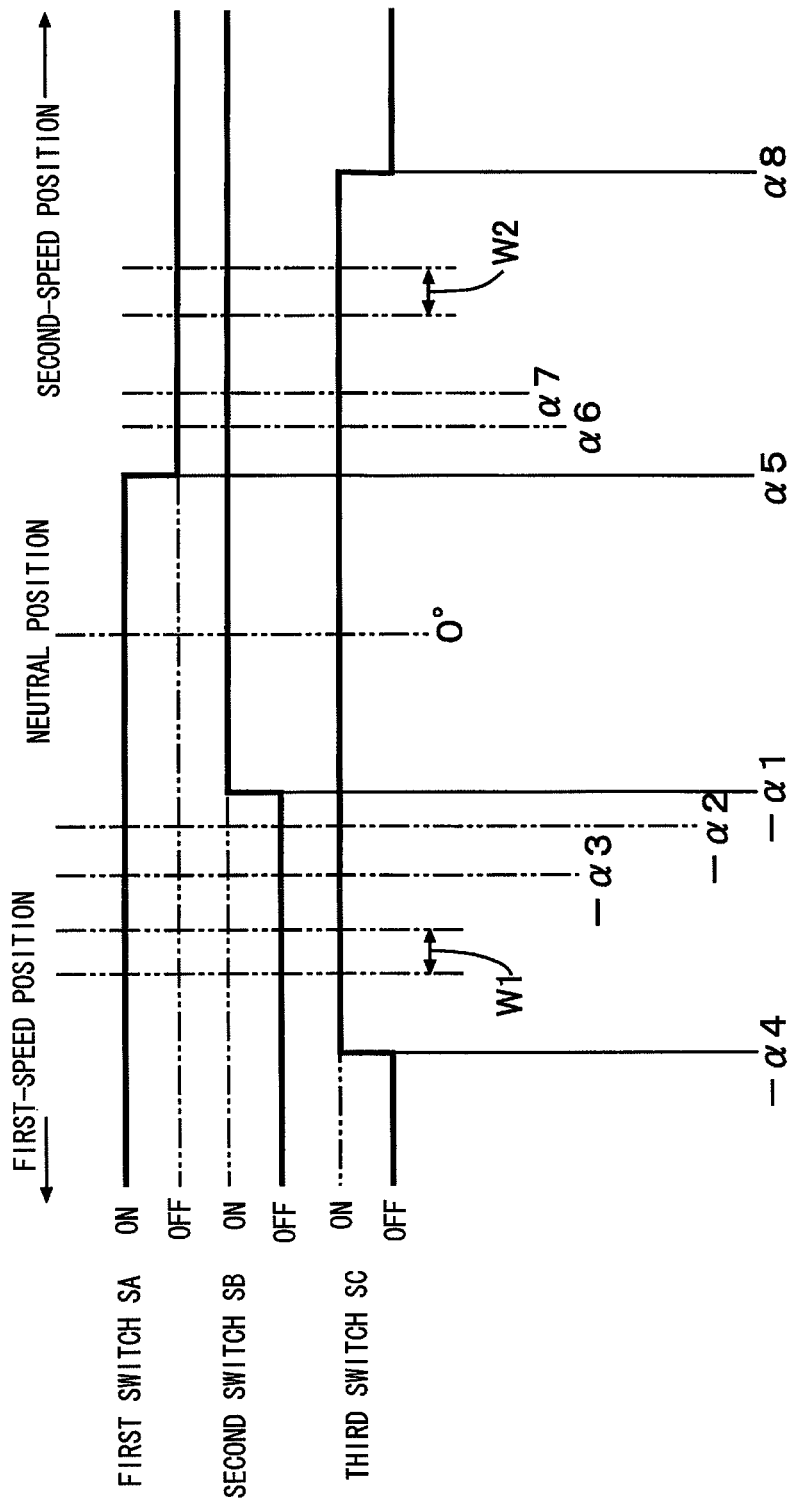
FIG. 10 is a view showing a timing of engagement of a shifter and a timing of releasing the engagement, an operational timing of a positioning means, and switching mode switching timings of respective switches between a first-speed position and a second-speed position in comparison.

In FIG. 10, assume the neutral position as an angle "0," a first-speed side as a minus side, and a second-speed side as a plus side. The engagement of the first shifter 72 with the first-speed drive gear 62 is released when the shift position is changed to the neutral position from the first speed at an angle $(-\alpha 2)$ on a more neutral position side than an angle $(-\alpha 3)$ at which the engagement of the first shifter 72 with the first-speed drive gear 62 is started when the shift position is changed to the first-speed position from the neutral position. The second switch SB is turned on when the shift position is changed to the neutral position from the first-speed position at an angle $(-\alpha 1)$ on a more neutral position side than these angles $(-\alpha 3, -\alpha 2)$. More specifically, when the shift position is changed to the neutral position from the first-speed position, the second switch SB and the third switch SC constitute two specified switches, and a timing at which a switching mode of the second switch SB that is one specified switch out of these two specified switches is brought into an ON state from an OFF state is set on a more neutral position side than a switching timing of the engagement of the first shifter 72 with the first drive gear 62 and a timing of the releasing of the engagement.

The engagement of the fourth shifter 77 with the second-speed driven gear 68 is released when the shift position is changed to the neutral position from the second-speed position at an angle $\alpha 6$ on a more neutral position side than an angle $\alpha 7$ at which the engagement of the fourth shifter 77 with the second-speed driven gear 68 is started when the shift position is changed to the second-speed position from the neutral position. The first switch SA is turned on when the shift position is changed to the neutral position from the second-speed position at an angle $\alpha 5$ on a more neutral position side than these angles $\alpha 7$, $\alpha 6$. More specifically, when the shift position is changed to the neutral position from the second-speed position, the first switch SA and the third switch SC constitute two specified switches, and a timing at which a switching mode of the first switch SA that is one specified switch out of these two specified switches is brought into an ON state from an OFF state is set on a more neutral position side than a switching timing of the engagement of the second shifter 77 with the second driven gear 68 and a switching timing of the releasing of the engagement.

A timing at which a switching mode of the third switch SC that constitutes the other specified switch out of the above-mentioned two specified switches SB, SC: SA, SC is brought into an ON state from an OFF state is arranged simultaneously with the above-mentioned switching timing or on a side more away from the neutral position than the switching timing. In this embodiment, when the shift position is changed to the neutral position from the first speed position, the switching mode of the third switch SC is brought into an ON state from an OFF state at an angle $(-\alpha 4)$ more away from the neutral position than the switching timing between the engagement of the first shifter 72 with the first drive gear 62 and the releasing of the engagement. When the shift position is changed to the neutral position from the second speed position, the switching mode of the third switch SC is brought into an ON state from an OFF state at an angle $\alpha 8$ on a side more away from the neutral position than the switching timing of the engagement of the fourth shifter 77 with the second driven gear 68 and the switching timing of the releasing of the engagement.

Figure 11:
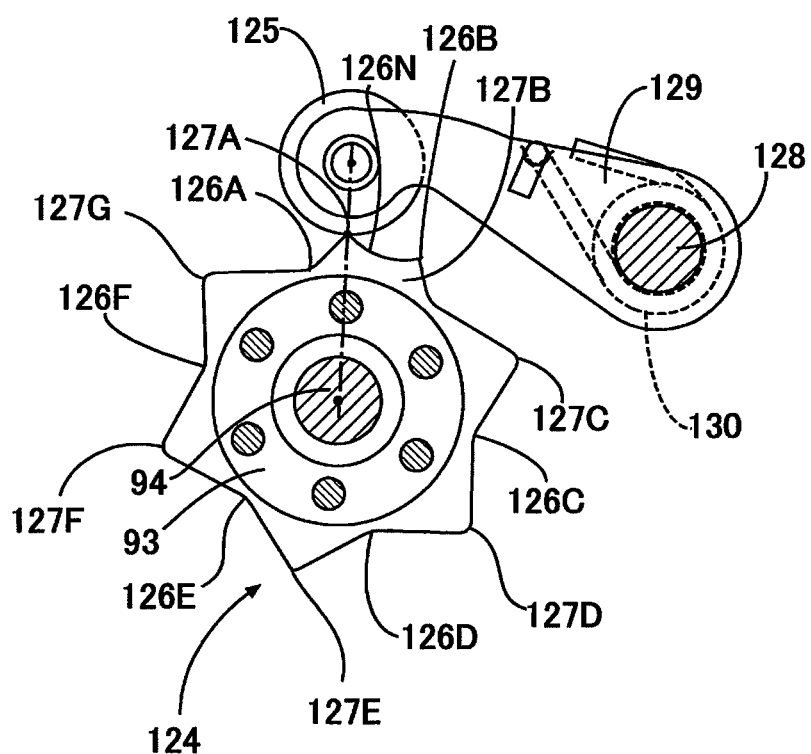
FIG. 11 is a view corresponding to FIG. 9 in a state where a roller is brought into contact with a top point of an intermediate projecting portion between a first-speed position and a neutral position.
Figure 12:
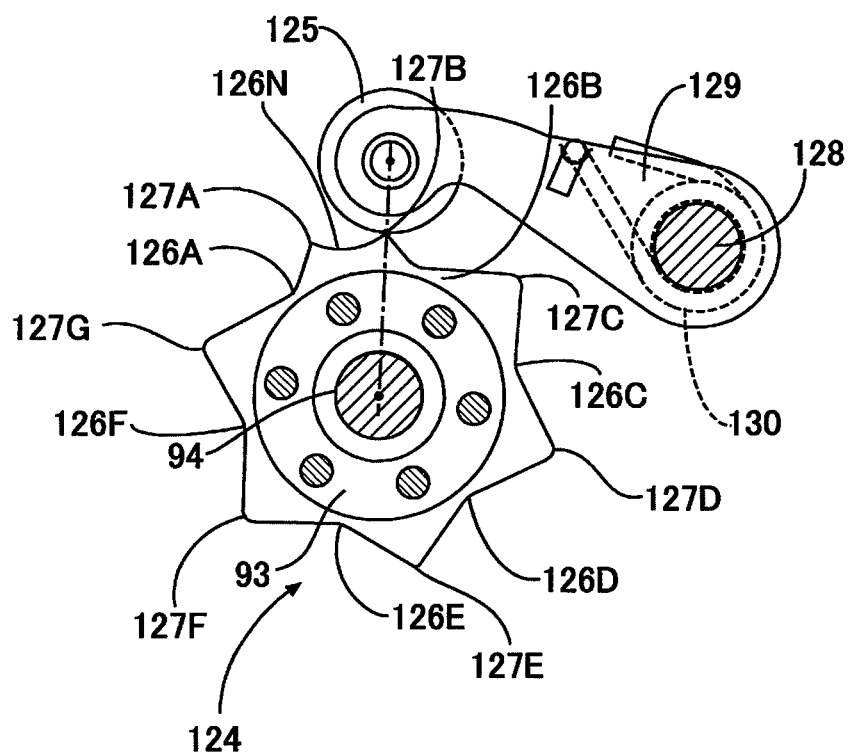
FIG. 12 is a view corresponding to FIG. 9 in a state where the roller is brought into contact with a top point of an intermediate projecting portion between a second-speed position and the neutral position.

As shown in FIG. 11, the roller 125 is brought into contact with a top point of the intermediate projecting portion 127A corresponding to a position between the first speed position and the neutral position out of the plurality of intermediate projecting portions 127A to 127G formed on the stopper plate 93 of the positioning means 124 that the multi-stage transmission M includes within a range indicated by W1 in FIG. 10. On the other hand, as shown in FIG. 12, the roller 125 is brought into contact with a top portion of the intermediate projecting portion 127B corresponding to a position between the second-speed position and the neutral position out of the plurality of intermediate projecting portions 127A to 127G within a range indicated by W2 in FIG. 10. A timing at which a switching mode of the third switch SC that constitutes the other specified switch out of the above-mentioned two specified switches SB, SC between the first-speed position and the neutral position is brought into an ON state from an OFF state and a timing at which a switching mode of the third switch SC that constitutes the other specified switch out of the above-mentioned two specified switches SA, SC between the second speed position and the neutral position is brought into an ON state from an OFF state are set on a side away from the neutral position than a timing at which the roller 125 is brought into contact with the top point of the intermediate projecting portion 127A corresponding to the position between the first speed position and the neutral position or a timing at which the roller 125 is brought into contact with the top point of the intermediate projecting portion 127B corresponding to the position between the neutral position and the second speed position. In this embodiment, the switching mode of the third switch SC between the first speed position and the neutral position is brought into an ON state from an OFF state at an angle (−α4) on a side opposite to the neutral position with respect to the range W1, and the switching mode of the third switch SC between the second speed position and the neutral position is brought into an ON state from an OFF state at an angle α8 on a side opposite to the neutral position with respect to the range W2.

The manner of operation of this embodiment is explained as follows. When the shift position is changed to the neutral position from at least one of the first-speed position and the second-speed position, the first and second projection rows 98, 99 that are objects to be detected by two specified switches among the first to third switches SA to SC, in this embodiment, the second and third switches SB, SC that are the specified switches when the shift position is changed to the neutral position from the first-speed position and the first and third switches SA, SC that are the specified switches when the shift position is changed to the neutral position from the second-speed position, are formed so as to change switching modes of the specified switches (SB, SC; SA, SC) from an OFF state to an ON state and to displace timings at which the specified switches are brought into an ON state from each other. Accordingly, there is no possibility that two specified switches are simultaneously brought into contact with the projecting portions of the projection rows 98, 99 that constitute objects to be detected by these switches. In this embodiment, there is no possibility that the contact of the second switch SB with the first projecting portion 98a of the first projection row 98 and the contact of the third switch SC with the fourth projecting portion 99a of the second projection row 99 take place simultaneously when the shift position is changed to the neutral position from the first-speed position. Also there is no possibility that the contact of the first switch SA with the first projecting portion 98a of the first projection row 98 and the contact of the third switch SC with the fourth projecting portion 99a of the second projection row 99 take place simultaneously when the shift position is changed to the neutral position from the second-speed position. Accordingly, a change in friction when the shift drum 85 is rotated toward the neutral position side can be alleviated and hence, it is possible to give a rider an operational feeling with no discomfort.

When the shift position is changed to the neutral position from the first-speed position, as shown in FIG. 13(a), the second switch SB is disposed at a position corresponding to a valley portion 98f of the first projection row 98 and, at the same time, the third switch SC is disposed at a position corresponding to a valley portion 99h of the second projection row 99 so that the switching modes of both the second switch SB and the third switch SC are in an OFF state. As shown in FIG. 13(b), the switching modes of the second switch SB and the third switch SC are brought into an ON state from an OFF state. Through this switching mode changeover period, as shown in FIG. 13(c), the second switch SB is brought into contact with a top portion of the first projecting portion 98a of the first projection row 98 so that the second switch SB is held in an ON state and, at the same time, the third switch SC is brought into contact with a top portion of the fourth projecting portion 99a of the second projection row 99 so that the third switch SC is held in an ON state. During such an operation, with respect to the friction resistance generated by the contact between the second and third switches SB, SC and the first and fourth projecting portions 98a, 99a, the friction resistance generated in the state shown in FIG. 13(b) is liable to become larger than the friction resistance generated in the state shown in FIG. 13(c). Wear that is generated by such a friction grows along with the increase of the number of times (lapsed years) that the switch is used so that the wear becomes larger. More specifically, when the first and second projection rows 98, 99 mounted on the shift drum 85 and detectors of the second and third switches SB, SC are made of metal, the first projecting portion 98a of the first projection row 98 and the second switch SB function as electric contacts, and the fourth projecting portion 99a of the second projection row 99 and the third switch SC function as electric contacts. Accordingly, in the state shown in FIG. 13(b), the first projecting portion 98a and the fourth projecting portion 99a are worn due to the contact thereof with the second and third switches SB, SC, and the wear is liable to be accelerated also due to sparks generated between the first and forth projecting portions 98a, 99a and the second and third switches SB, SC whereby the wear in the state shown in FIG. 13(b) is liable to be increased with time. The same goes for the change of the shift position from the second-speed position to the neutral position. Such a drawback can be effectively overcome by the invention where when the shift position is changed to the neutral position from at least one of the first-speed position and the second-speed position, the switching modes of two specified switches among the first to third switches SA to SC are changed to an ON state from an OFF state and, at the same time, timings at which two specified switches are brought into an ON state are displaced from each other. A change in friction when the shift drum 85 is rotated to a neutral position side can be made gentle through the use over a longer period.

The multi-stage transmission M is configured such that the first shifter 72 is engaged with the first-speed drive gear 62 that constitutes a part of the first-speed gear train G1 so as to establish the first-speed gear train G1, and the fourth shifter 77 is engaged with the second-speed driven gear 68 that constitutes a part of the second-speed gear train G2 so as to establish the second-speed gear train G2. A timing at which a switching mode of the second switch SB or the first switch SA that constitutes one specified switch out of two specified switches SB, SC: SA, SC is brought into an ON state from an OFF state is set on a more neutral position side than a switching timing of the engagement of the first and fourth shifters 72, 77 with the first-speed drive gear 62 and the second-speed driven gear 68 and a switching timing of the releasing of the engagement. A timing at which the switching mode of the third switch SC that constitutes the other specified switch is brought into an ON state from an OFF state is arranged simultaneously with the switching timing or on a side more away from the neutral position than the switching timing. Accordingly, in a state where the neutral position is detected, the first and the fourth shifters 72, 77 are surely brought into an engagement release state. Thus, the degree of freedom in setting a timing at which the third switch SC is brought into an ON state is enhanced.

The positioning means 124 that the multi-stage transmission M includes the stopper plate 93 that is fixed to the shift drum 85 so as to be rotated together with the shift drum 85 and has the outer periphery on which the plurality of positioning recessed portions 126A, 126B, 126C, 126D, 126E, 126F, 126N corresponding to the respective shift positions and the plurality of intermediate projecting portions 127A, 127B, 127C, 127D, 127E, 127F, 127G each of which is arranged between each two positioning recessed portions 126A to 126F, 126N are formed and the roller 125 that is resiliently brought into contact with the outer periphery of the stopper plate 93. The timing at which the switching mode of the third switch SC is brought into an ON state from an OFF state is set on a side more away from the neutral position than a timing at which the roller 125 is brought into contact with a top point of the intermediate projecting portion 127A corresponding to a position between the first-speed position and the neutral position and a timing at which the roller 125 is brought into contact with a top point of the intermediate projecting portion 127B corresponding to a position between the neutral position and the second-speed position. Accordingly, although the timings at which the roller 125 is brought into contact with the top points of the intermediate projecting portions 127A, 127B are timings at which a friction generated when the shift drum 85 is rotated becomes large, by bringing the third switch SC into an ON state at the timing displaced from the timings at which the roller 125 is brought into contact with the top points of the intermediate projecting portions 127A, 127B when the shift position is changed to the neutral position, it is possible to prevent a change in friction from being increased thus giving a rider an operational feeling with no discomfort.

The first projection row 98 that is the projection row constituting an object to be detected by the remaining switch other than two specified switches SB, SC: SA, SC, that is, the first switch SA when the shift position is changed to the neutral position from the first-speed position and the second switch SB when the shift position is changed to the neutral position from the second-speed position is configured to hold a switching mode of the remaining switch SA, SB in an ON state in at least one of a time during which the shift position is changed to the neutral position from the first-speed position and a time during which the shift position is changed to the neutral position from the second-speed position. Accordingly, the remaining switch SA, SB is held in an ON state when the shift position is changed to the neutral position from the first-speed position and the second-speed position. Thus, there is no timing at which a friction is increased. Accordingly, in setting timings at which two specified switches SB, SC: SA, SC are brought into an ON state, it is unnecessary to take into account a timing at which the remaining switch SA, SB is brought into an ON state whereby the degree of freedom in setting timings at which two specified switches SA, SB are brought into an ON state.

When the shift position is changed to the neural position from the first-speed position, the second switch SB that constitutes one switch out of two specified switches SB, SC and the first switch SA that constitutes the remaining switch are fixedly arranged corresponding to the common first projection row 98 while making phases thereof different from each other. When the shift position is changed to the neural position from the second-speed position, the third switch SC that constitutes one switch out of two specified switches SA, SC and the first switch SA that constitutes the remaining switch are fixedly arranged corresponding to the common first projection row 98 while making phases thereof different from each other. Accordingly, the remaining switch other than two specified switches among three switches SA to SC is held in an ON state when the shift position is changed to the neutral position from both the first-speed position and the second-speed position. Thus, there is no timing at which a friction is increased. Further, the one switch out of two specified switches and the remaining switches correspond to one common projection row 98 while making phases thereof different from each other. Thus, it is possible to minimize a change in friction when the shift drum 85 is rotated while minimizing the number of projection rows to 2, that is, projection rows 98, 99.

Although the embodiment of the invention has been explained heretofore, the invention is not limited to the above-mentioned embodiment and various design modifications are conceivable without departing from the invention called for in claims.

For example, the multi-stage transmission M mounted on a motorcycle is explained in the above-mentioned embodiment. However, the invention is also applicable to a multi-stage transmission mounted on a three-wheeled motorcycle or a four-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift position detecting device comprising:
a plurality of projection rows each including projecting portions arranged at a plurality of places in a spaced-apart manner in a circumferential direction of a shift drum constituting a part of a multi-stage transmission having gear trains of a plurality of shift stages that are selectively engagable, and are mounted on the shift drum;
three switches fixedly arranged at least one by one corresponding to the plurality of projection rows wherein a switching mode is changed from an OFF state to an ON state by being brought into contact with the projecting portions; and
an electronic control unit for determining a shift position by collating the shift position based on a combination of "1" generated when the switches are in an ON state and "0" generated when the switches are in an OFF state;
wherein the plurality of projection rows that are detected by a first switch and a second switch are formed to change switching modes of the first and second switches from an OFF state to an ON state and to displace timings at which the first and second switches are brought into an ON state from each other when the shift position is changed from at least one of a first speed position and a second speed position to a neutral position.

2. The shift position detecting device according to claim 1,
wherein a shifter is engaged with a gear that constitutes a part of at least one of a first-speed gear train and a second-speed gear train so as to establish at least one of the first-speed gear train and the second-speed gear train, a timing at which a switching mode of the first switch is brought into an ON state from an OFF state is set closer to the neutral position of the shift drum than switching timings of engagement of the shifter with the gear and releasing of the engagement, and a timing at which a switching mode of the second switch is brought into an ON state from an OFF state is arranged simultaneously with the switching timing or further from the neutral position of the shift drum.

3. The shift position detecting device according to claim 2, wherein the multi-stage transmission includes a positioning means that positions the shift drum at rotary positions corresponding to respective shift positions, the positioning means includes a stopper plate fixed to the shift drum to rotate together with the shift drum and has an outer periphery on which a plurality of positioning recessed portions corresponding to the respective shift positions and a plurality of intermediate projecting portions each of which is arranged between each two positioning recessed portions are formed; and a pressing member that is resiliently brought into contact with an outer periphery of the stopper plate, and a timing at which the switching mode of the second switch is brought into an ON state from an OFF state is set closer to the neutral position of the shift drum than a timing at which the pressing member is brought into contact with a top point of the intermediate projecting portion corresponding to a position between the first-speed position and the neutral position or a timing at which the pressing member is brought into contact with a top point of the intermediate projecting portion corresponding to a position between the neutral position and the second-speed position.

4. The shift position detecting device according to claim 3, wherein the projection row that constitutes an object to be detected by the third switch other than first and second switches is configured to hold a switching mode of the third switch in an ON state in at least one of a time during which a shift position is changed to the neutral position from the first-speed position and a time during which the shift position is changed to the neutral position from the second-speed position.

5. The shift position detecting device according to claim 4, wherein the projection row that are detected by the third switch is configured to hold a switching mode of the third switch in an ON state in the time during which the shift position is changed to the neutral position from the first-speed position and the time during which the shift position is changed to the neutral position from the second-speed position, and one switch out of the first and second switches and the third switch are fixedly arranged corresponding to one common projection row having different ON/OFF states.

6. The shift position detecting device according to claim 2, wherein the projection row that constitutes an object to be detected by a third switch is configured to hold a switching mode of the third switch in an ON state in at least one of a time during which a shift position is changed to the neutral position from the first-speed position and a time during which the shift position is changed to the neutral position from the second-speed position.

7. The shift position detecting device according to claim 6, wherein the projection row that constitutes an object to be detected by the third switch is configured to hold a switching mode of the third switch in an ON state in the time during which the shift position is changed to the neutral position from the first-speed position and the time during which the shift position is changed to the neutral position from the second-speed position, and one switch out of the first and second switches and the third switch are fixedly arranged corresponding to one common projection row having different ON/OFF states.

8. A shift position detecting device comprising:
a shift drum constituting a part of a multi-stage transmission having gear trains including a plurality of shift stages being selectively engagable;
a plurality of projection rows each including a plurality of projecting portions arranged in a spaced-apart manner in a circumferential direction of the shift drum;
three switches fixedly arranged at least one by one corresponding to the plurality of projection rows wherein a switching mode is changed from an OFF state to an ON state by being brought into contact with the projecting portions; and
an electronic control unit for determining a shift position by collating the shift position based on detection logic that is formed of a combination of "1" generated when the switches are in an ON state and "0" generated when the switches are in an OFF state;
wherein the plurality of projection rows that are detected by the first and second switches among the three switches are formed to change switching modes of the first and second switches from an OFF state to an ON state and to displace timings at which the first and second switches are brought into an ON state from each other when the shift position is changed from at least one of a first speed position and a second speed position to a neutral position.

9. The shift position detecting device according to claim 8, wherein the multi-stage transmission is configured wherein a shifter is engaged with a gear that constitutes a part of at least one of a first-speed gear train and a second-speed gear train so as to establish at least one of the first-speed gear train and the second-speed gear train, a timing at which a switching mode of one of the first and second switches is brought into an ON state from an OFF state is set closer to the neutral position than switching timings of engagement of the shifter with the gear and releasing of the engagement, and a timing at which a switching mode of the second switch is brought into an ON state from an OFF state is arranged simultaneously with the switching timing or further away from the neutral position of the shift drum than the switching timing.

10. The shift position detecting device according to claim 9, wherein the multi-stage transmission includes a positioning means that positions the shift drum at rotary positions corresponding to respective shift positions, the positioning means includes a stopper plate fixed to the shift drum to rotate together with the shift drum and has an outer periphery on which a plurality of positioning recessed portions corresponding to the respective shift positions and a plurality of intermediate projecting portions each of which is arranged between each two positioning recessed portions are formed; and
a pressing member that is resiliently brought into contact with an outer periphery of the stopper plate, and a timing at which the switching mode of the second switch is brought into an ON state from an OFF state is set further away from the neutral position of the shift drum than a timing at which the pressing member is brought into contact with a top point of the intermediate projecting portion corresponding to a position between the first-speed position and the neutral position or a timing at which the pressing member is brought into contact with a top point of the intermediate projecting portion corresponding to a position between the neutral position and the second-speed position.

11. The shift position detecting device according to claim 10, wherein the projection row that constitutes an object to be detected by the third switch is configured to hold a switching mode of the third switch in an ON state in at least one of a time during which a shift position is changed to the neutral position from the first-speed position and a time during which the shift position is changed to the neutral position from the second-speed position.

12. The shift position detecting device according to claim 11, wherein the projection row that constitutes an object to be detected by the third switch is configured to hold a switching mode of the third switch in an ON state in the time during which the shift position is changed to the neutral position from the first-speed position and the time during which the shift position is changed to the neutral position from the second-speed position, and one switch out of the first and second switches and the third switch are fixedly arranged corresponding to one common projection row having different ON/OFF states.

13. The shift position detecting device according to claim 9, wherein the projection row that constitutes an object to be detected by a third switch is configured to hold a switching mode of the third switch in an ON state in at least one of a time during which a shift position is changed to the neutral position from the first-speed position and a time during which the shift position is changed to the neutral position from the second-speed position.

14. The shift position detecting device according to claim 13, wherein the projection row that constitutes an object to be detected by the third switch is configured to hold a switching mode of the third switch in an ON state in the time during which the shift position is changed to the neutral position from the first-speed position and the time during which the shift position is changed to the neutral position from the second-speed position, and one switch out of the first and second switches and the third switch are fixedly arranged corresponding to one common projection row having different ON/OFF states.

15. A shift position detecting device comprising:
a plurality of projection rows each including a plurality of projecting portions arranged in a spaced-apart manner in a circumferential direction of a shift drum constituting a part of a multi-stage transmission having gear trains of a plurality of shift stages that are selectively engagable;
three switches fixedly arranged at least one by one corresponding to the plurality of projection rows wherein a switching mode is changed from an OFF state to an ON state by being brought into contact with the projecting portions; and
an electronic control unit for determining a shift position by collating the shift position based on detection logic that is formed of a combination of "1" generated when the switches are in an ON state and "0" generated when the switches are in an OFF state;
wherein the plurality of projection rows that are detected by the first and second switches among the three switches are formed to change switching modes of the first and second switches from an OFF state to an ON state and to displace timings at which the first and second switches are brought into an ON state from each other when the shift position is changed from at least one of a first speed position and a second speed position to a neutral position;

said multi-stage transmission being configured wherein a shifter is engaged with a gear constituting a part of at least one of a first-speed gear train and a second-speed gear train so as to establish at least one of the first-speed gear train and the second-speed gear train, a timing at which a switching mode of the first switch is brought into an ON state from an OFF state is set closer to the neutral position than switching timings of engagement of the shifter with the gear and releasing of the engagement, and a timing at which a switching mode of the second switch is brought into an ON state from an OFF state is arranged simultaneously with the switching timing or further away from the neutral position of the shift drum than the switching timing.

16. The shift position detecting device according to claim 15, wherein the multi-stage transmission includes a positioning means for positioning the shift drum at rotary positions corresponding to respective shift positions, the positioning means includes a stopper plate fixed to the shift drum to rotate together with the shift drum and has an outer periphery on which a plurality of positioning recessed portions corresponding to the respective shift positions and a plurality of intermediate projecting portions each of which is arranged between each two positioning recessed portions are formed; and
a pressing member that is resiliently brought into contact with an outer periphery of the stopper plate, and a timing at which the switching mode of the second switch is brought into an ON state from an OFF state is set on further away from the neutral position of the shift drum than a timing at which the pressing member is brought into contact with a top point of the intermediate projecting portion corresponding to a position between the first-speed position and the neutral position or a timing at which the pressing member is brought into contact with a top point of the intermediate projecting portion corresponding to a position between the neutral position and the second-speed position.

17. The shift position detecting device according to claim 16, wherein the projection row that constitutes an object to be detected by the third switch is configured to hold a switching mode of the third switch in an ON state in at least one of a time during which a shift position is changed to the neutral position from the first-speed position and a time during which the shift position is changed to the neutral position from the second-speed position.

18. The shift position detecting device according to claim 17, wherein the projection row that constitutes an object to be detected by the third switch is configured to hold a switching mode of the third switch in an ON state in the time during which the shift position is changed to the neutral position from the first-speed position and the time during which the shift position is changed to the neutral position from the second-speed position, and one switch out of the first and second switches and the third switch are fixedly arranged corresponding to one common projection row having different ON/OFF states.

19. The shift position detecting device according to claim 15, wherein the projection row that constitutes an object to be detected by a third switch is configured to hold a switching mode of the third switch in an ON state in at least one of a time during which a shift position is changed to the neutral position from the first-speed position and a time during which the shift position is changed to the neutral position from the second-speed position.

20. The shift position detecting device according to claim 19, wherein the projection row that constitutes an object to be detected by the third switch is configured to hold a switching mode of the third switch in an ON state in the time during which the shift position is changed to the neutral position from the first-speed position and the time during which the shift position is changed to the neutral position from the second-speed position, and one switch out of the first and second switches and the third switch are fixedly arranged corresponding to one common projection row having different ON/OFF states.

* * * * *